(12) United States Patent
Nogaret et al.

(10) Patent No.: US 8,336,907 B2
(45) Date of Patent: Dec. 25, 2012

(54) INTERIOR PANEL COMPONENT WITH INTEGRATED AIRBAG COVER

(75) Inventors: Eric Nogaret, Bisheim (FR); Pierre Pignard, Jebsheim (FR)

(73) Assignee: Peguform GmbH, Bötzingen (DE)

( * ) Notice: Subject to any disclaimer, the term of this patent is extended or adjusted under 35 U.S.C. 154(b) by 155 days.

(21) Appl. No.: 12/935,128

(22) PCT Filed: Mar. 3, 2009

(86) PCT No.: PCT/EP2009/001494
§ 371 (c)(1),
(2), (4) Date: Sep. 28, 2010

(87) PCT Pub. No.: WO2009/132728
PCT Pub. Date: Nov. 5, 2009

(65) Prior Publication Data
US 2011/0121547 A1 May 26, 2011

(30) Foreign Application Priority Data

Apr. 30, 2008 (EP) ..................................... 08008250

(51) Int. Cl.
*B60R 21/215* (2011.01)
*B60R 21/205* (2011.01)
*B29C 45/04* (2006.01)

(52) U.S. Cl. .................. 280/728.3; 280/732; 264/328.1; 425/553

(58) Field of Classification Search ............... 280/728.3, 280/732; 264/241, 250, 255, 328.1, 328.7, 264/328.8, 328.11, 254; 425/110, 111, 112, 425/117, 120, 125, 127, 129.1, 130, 134, 425/149, 542, 553, 574, 577

See application file for complete search history.

(56) References Cited

U.S. PATENT DOCUMENTS 3,793,415 A * 2/1974 Smith .......................... 264/45.2

(Continued)

FOREIGN PATENT DOCUMENTS

DE 196 17 874 A1 10/1996

(Continued)

OTHER PUBLICATIONS

"Integrated" Definition, Dictionary.Com, available at, http://dictionary.reference.com/browse/integrated?r=66 (last visited Apr. 26, 2012).*

(Continued)

*Primary Examiner* — Joseph Rocca
(74) *Attorney, Agent, or Firm* — Henry Feiereisen LL.C.

(57) ABSTRACT

The object of the present invention is an internal panel component for motor vehicles comprising an integrated air bag cover (1) and a method and device for the manufacture thereof. The internal panel component is characterized in that the area of the air bag cover 91) the decorative layer (2) is adapted as a multifunctional layer that enclosed the air bag cover (1) on both sides. The manufacture of the internal panel component according to the invention is done in an at least two-stage molding tool comprising a slide (16) integrated into the molding tool core (5) in the area of the air bag cover (1), said slide being shifted for expanding the cavity (14) provided in the area of the air bag cover (1) for the formation of a decorative layer (2), said cavity being expandable up to the back side of the support (3) of the air bag cover (1).

18 Claims, 5 Drawing Sheets

U.S. PATENT DOCUMENTS

| | | | | |
|---|---|---|---|---|
| 3,809,733 | A | * | 5/1974 | Sandiford et al. ............ 264/255 |
| 5,601,429 | A | * | 2/1997 | Blacklock .................... 433/174 |
| 5,676,901 | A | * | 10/1997 | Higashi et al. ................ 264/255 |
| 5,957,483 | A | * | 9/1999 | Miltenberger et al. .... 280/728.3 |
| 6,030,567 | A | * | 2/2000 | Takeuchi ..................... 264/255 |
| 6,042,139 | A | * | 3/2000 | Knox ......................... 280/728.3 |
| 2006/0073226 | A1 | * | 4/2006 | Kimura et al. ............. 425/129.1 |
| 2006/0103117 | A1 | * | 5/2006 | Hayashi ..................... 280/728.3 |
| 2007/0152429 | A1 | * | 7/2007 | Dailey et al. ............... 280/728.3 |

FOREIGN PATENT DOCUMENTS

| | | |
|---|---|---|
| DE | 10 2006 016 724 A1 | 10/2007 |
| EP | 1 754 635 A | 2/2007 |
| FR | 2 768 675 A | 3/1999 |

OTHER PUBLICATIONS

"Passage" Definition, Dictionary.Com, available at, http://dictionary.reference.com/browse/passage?r=66 (last visited Apr. 27, 2012).*

"Compact" Definition, Dictionary.Com, available at, http://dictionary.reference.com/browse/compact?s=t (last visited Apr. 27, 2012).*

* cited by examiner

INTERIOR PANEL COMPONENT WITH INTEGRATED AIRBAG COVER

CROSS-REFERENCES TO RELATED APPLICATIONS

This application is the U.S. National Stage of International Application No. PCT/EP2009/001494, filed Mar. 3, 2009, which designated the United States and has been published as International Publication No. WO 2009/132728 and which claims the priority of European Patent Application, Serial No. 08 008 250.6, filed Apr. 30, 2008, pursuant to 35 U.S.C. 119(a)-(d).

BACKGROUND OF THE INVENTION

The invention refers to an interior paneling component for motor vehicles, in particular dashboard-, side-, column- or door paneling, with an integrated airbag cover and a method and a device for their manufacture.

Components for interior paneling of motor vehicles today normally serve also always to cover up air bag modules. In order to realize a deployment of the air bag without any problems in case of an accident, the components are provided with air bag covers which easily open up upon deployment of the air bag, and thus support the inflation of the air bag into the interior of the vehicle. A frictionless and secure function of the air bag is possible only when the air bag cover functions in such a way that it controls the unfolding of the air bag. Thus, the air bag cover must be provided with a hinge which facilitates the opening of the cover. Furthermore, it has to be made sure that the cover, upon opening, does not get uncontrollably destroyed thereby hurling splinters throughout the interior of the vehicle and thus endangering the passengers in the vehicle. In order to avoid such, the air bag cover is normally provided with a splinter protection. This function is oftentimes carried out by separate systems such as for example, by sheet metal or textiles.

The air bag hinge usually also has the function to reduce surplus energies when fulfilling the protective function upon the fast and explosive deployment of the air bag, which requires a correspondingly large amount of energy. The explosive deployment of the airbag can lead to severe damage to the support part, leading to sharp edges that can cause severe injuries to the vehicle passengers and should be prevented by absorbing a portion of the surplus energy already upon opening of the air bag cover and thereby reducing the potential for injury to the passengers of the vehicle.

From the prior art diverse means are known for absorbing a portion of the energy generated upon the opening of the air bag cover, which all have the purpose of providing resistance to the airbag upon deployment in the area of the air bag cover, such that a portion of the energy is used upon overcoming the resistance. The air bag cover itself is normally constructed from several plastic layers, which provide the cover with sufficient elasticity and firmness and wherein normally different plastic materials are utilized for each layer whose properties are combined in order to provide sufficient resistance to the unfolding air bag. Oftentimes, the cover is also constructed as a hybrid-type, with reinforcement materials that are built into the plastic material and to realize the necessary firmness for the cover. Steel sheets and textiles can, for example, be utilized as composite materials.

A purposeful opening of the air bag cover is also realized in that the area of the air bag cover additionally is provided with pre-determined rupture lines or weakened areas whose configuration on the one hand controls the force required for breaking open the cover, and on the other hand, by their spatial arrangement controls the targeted and clean breaking of the cover.

From the afore-described it is easily seen that a functional configuration of the air bag cover is associated with relatively high expenditure of work and cost.

Since no such high expenditures are required from the remaining portions of a component for an interior paneling, it is customary to manufacture the component in several process steps, whereby oftentimes, the air bag area is first manufactured separately or together with the support for the plastic molding part and in a subsequent step, the component is finalized by applying additional layers and decorating layers, which fulfill the afore-described functions.

This type of manufacturing is not only very time consuming, but also requires high technical expenditures. In the past, it was always attempted to configure the area of the airbag cover of interior paneling components for motor vehicles in a simpler manner and with less expenditures yet without endangering the functionality of the air bag and without endangering the passengers in the vehicle.

In the DE 196 17 874 C2, the manufacture of an air bag cover for a dash board is described, wherein the dash board consists of a support layer and cover layer and the air bag cover is connected with the remaining area of the dash board via a hinge. The process is configured in such a way that the dash board with the air bag air bag cover is produced by injection molding in a single injection mold tool in several molding steps. Initially, the support layer is formed with the mold tool and subsequently provided with a cover layer in a second molding step. During manufacturing of the support, a gliding stamp fitted for the mold tool core is introduced into the cavity, in order to thus bring in openings in the area of the hinge. These hinge openings are provided as a passage for the soft resin injected in the second molding step, in order to form a strip at the rear side surface of the support in the area of the hinge, by means of which the hinge is strengthened and the air bag cover is held upon swinging open. The swinging open itself is facilitated by a rupture line which corresponds to the hinge. A disadvantage of this arrangement is that the airbag cover itself is coated only on one side which, according to experience, does not realize an optimal splinter protection. This disadvantage can be alleviated by adding another work step, in that in a separate mold tool at the rear surface of the air bag cover an additional splinter protection is placed by either gluing or by other means. However, this shows that the entire production will be considerably more expensive relative to cost and time.

SUMMARY OF THE INVENTION

It is an object of the present invention to provide an interior paneling component for motor vehicles which are cost efficient and can be produced in less time and without the drawbacks of the prior art.

This object is solved according to the present invention by providing an interior paneling component for motor vehicles with an integrated air bag cover which essentially includes a decorating layer, an air bag cover integrated into a support, where the support in the area of a hinge for the air bag cover is provided with at least one passage, and wherein the decorating layer in the area of the air bag cover is configured as a multifunctional layer which encloses the air bag cover on both sides, wherein the layer at the visual side of the interior panel component has optical and haptic functions and in the area of the air bag cover has additional functions as hinge, splinter protection and energy absorber, wherein the function areas of the multifunctional layer forms a material unit, into which the air bag cover is embedded in sandwich-like manner. Advantageous embodiments of the interior paneling component are subject of the corresponding dependent claims.

It is also an object of the present invention to provide a method for the production of an interior paneling component with integrated air bag cover for a motor vehicle which does not exhibit the drawbacks of the prior art.

This object is solved by a process for the production of an interior paneling component for a motor vehicle with a method for the production of an interior paneling component for a motor vehicle, where the interior paneling component is essentially constructed of a decorating layer and a support with an integrated air bag cover, wherein the support in the area of the hinge has at least one passage for the air bag cover, wherein the method includes at least a two step mold tool, wherein a) in a first step, with a first mold counter part and a first cavity via a first injection molding cycle with a thermoplastic material, the support is molded with an integrated air bag cover; and b) in a second step with a second mold counterpart and a second cavity in a second injection molding cycle the decorating layer is molded by flooding the support with a thermoplastic elastomeric material, wherein before flooding the support, a slider provided in the mold tool core in the area of the air bag cover, is moved and the second cavity is being expanded via the passage towards the rear side of the support, such that when flooding the support with the thermoplastic elastomeric material, a multifunctional layer is formed which encloses the air bag cover on both sides, whereby the layer at the viewing side of the interior paneling component includes optical and haptic functions and in the area of the air bag cover, has additional functions as a hinge, a splinter protection and energy absorber, whereby the functional area of the multifunctional layer form a material unit which are embedded into the air bag cover in a sandwich-like manner. Advantageous embodiments and further developments are the subject of the corresponding dependent claims.

It is a further object of the present invention to provide a device for the production of an interior paneling component of a motor vehicle with an integrated air bag cover and without the drawbacks of the devices according to the prior art.

This object is solved by a device for the production of an interior paneling component for motor vehicles with integrated air bag cover, wherein the device comprises at least a two step mold tool with a mold tool core and a first mold counterpart with a first cavity for the formation of a support, with an integrated air bag cover in a first method step, as well as a second mold counter part with a second cavity for the formation of a decorating layer in a second method step, wherein a portion of the mold tool core in the area of the air bag cover is provided as a slider for the formation of an additional cavity at the rear side of the air bag cover in a second infection molding cycle. Advantageous embodiments of the device according to the invention are the subject of the corresponding dependent claims.

The invention is based on the exploitation of elastic thermoplastic materials such as for example thermoplastic polyetherester (TPEE), thermoplastic polystyrene (TPS), thermoplastic vulcanized material (TPEV), polyvinylchloride (PVC) or thermoplastic polyurethane (TPU) for the production of a decorating layer at a support for an interior paneling component, whereby the elastomeric material in the area of the air bag cover at the same time takes on the function of a hinge, a splinter protection and an energy absorber. In this manner, a complete interior paneling component with a functioning integrated air bag cover can be produced in single mold tool. Since no further tools are required, the production costs can be markedly less due to the reduced investment cost.

The core of the invention is thus, that the decorating layer in the area of the entire air bag cover is constructed as a multifunctional layer that encloses the air bag cover on both sides. This layer takes on the function of a hinge, that of the splinter protection and that of an energy absorber, which normally are filled by separate systems, such as for example steel sheets, textiles and other means. The viewing side of the decorating layer includes optical and haptic functions, while the layer at the rear side of the air bag cover functions as splinter protection. In order to facilitate access of the thermoplastic material to the rear side of the support or, the rear side of the air bag cover, one or more local passages are provided, at least in the area of the hinge, or advantageously distributed across the entire area of the air bag cover, through which, the injection of the decorating material reaches the rear side of the support or the air bag cover. In particular, it is thus realized that the air bag cover is subsequently embedded in a sandwich-like manner in the decorating layer material and thus confers an optimal splinter protection. At the same time, the elastomeric material takes on the function of a hinge and thus serves as an energy absorber, while serving a decorating function at the viewing side.

All these functions are usually fulfilled by separate systems, such as for example steel sheets, textiles and other means.

The support of the interior paneling component usually consists of thermoplastic material from the group polypropylene (PP), polybutyleneterephthalate (PBT), polyamide (PA), acrylonitrile-butadiene-styrene (ABS), acrylonitrile-butadiene-stryrene/polycarbonate-copolymerisate (ABS/PC) or polyoxymethylene (POM and can be reinforced with fibers, such as for example, glass fibers or textile natural fibers.

The decorating layer consists of a thermoplastic elastomeric material form the group thermoplastic polyetherester (TPEE), polyvinylchloride (PVC), thermoplastic polystyrene (TPS), thermoplastic polyurethane (TPU) and can be formed as a compact layer or a foamed layer.

The support with the integrated air bag cover is the starting point for the production of the interior paneling component, wherein the air bag cover can be integrated into the support in various ways. A preferred embodiment of the method provides that the support with airbag cover is produced in one molding step in an injection molding process. It may however, be advantageous to place the prefabricated air bag cover in a corresponding injection molding tool and to subsequently extrusion coat it with the support material.

As already afore-stated, the support in the area of the air bag cover includes at least one passage which permits flooding the rear side of the air bag cover with decorating material. An advantageous embodiment of the present invention provides several passages in the area of the air bag cover, wherein at least one passage in the hinge area of the cover is essential to the invention, in that additionally, a hinge is formed by means of the elastomeric material. Moreover it is advantageous, if the passages are also provided in the area of the cover, by which an additional mechanical connection is realized which improves the splinter protection. A distribution of passages at the air bag cover past the area of the hinge has the additional positive advantage, in that generally flooding the rear side of the air bag cover is facilitated.

An alternative embodiment of the present invention provides that the passages on the support and the corresponding cavity at the rear side of the air bag cover is to be configured such that in a second production step, a netted coating is formed at the rear side of the air bag cover, which fulfills the desired splinter protection function without the need to coating the entire rear side of the air bag cover.

The material properties of the elastomeric material are selected such that the plastic material exhibits a sufficient firmness and elasticity in order to function as a hinge and at the same time an optimal splinter protection is realized.

This property profile determines that the rupture lines required for an easy opening of the air bag are formed advantageously only during or after the completion of the component so that the rupture line is essentially free of elastomeric material. The rupture line itself is configured as a groove or perforation which penetrates the support and advantageously extends into the decorating layer. An especially advantageous embodiment of the present invention provides, that the component in the area of the rupture line is weakened to a thin residual wall in the decorating layer, so that there is a controlled opening that takes place at the rupture line, while the hinge, consisting of a thick layer of elastomeric material, is capable to hold the entire air bag cover after opening and at the same time absorb energy upon opening.

The air bag cover itself can be configured in different ways. The simplest embodiment provides that the air bag cover constitutes a part of the support and is being cast in the first production step, and the required passages are formed by means of a suitable configuration of the casting mold.

It can however also be advantageous to produce the air bag cover as a separate part and to place it into the mold tool prior to the first molding step, wherein during the first molding step, the air bag cover is surrounded to thus form a support with an integrated air bag cover. In this case also, the passages that are required for the later overflow are formed by means of as suitable configuration of the casting mold, or, are realized already before the manufacturing of the separate air bag cover.

Purpose of the present invention is also to offer a method for the production of an interior paneling component for a motor vehicle where the essential steps of the production is possibly carried out in a single tool and render superfluous a multistep mounting requiring lots of personnel.

According to the present invention, the production of the interior paneling component, which is essentially constructed as a decorating layer and a support, takes place in a single mold tool comprising at least two steps via at least two injection molding cycles. In the first step, by means of a first mold counter part and a first cavity, and via a first injection molding cycle, the support with the integrated air bag cover is formed out of thermoplastic material from the group, polypropylene (PP), polybutyleneterepthalate (PBT), polyamide (PA) acrylonitril butadiene styrene (ABS), acrylo-nitril-butadiene-styrene/polycarbonate-copolimerisate (ABS/OC) or polyoxymethylene (POM).

After hardening the support, in a second step, with a second mold counter part, the decorating layer is formed in a second injection molding cycle from thermoplastic elastomeric material of the group of thermoplastic polyetherester (TPEE), thermoplastic polystyrene (TPS), thermoplastic vulcanizing material (TPEV), polyvinylchloride (PVC) or thermoplastic polyurethane (TPU) is brought onto the support, whereby the support is flooded with thermoplastic elastomeric material.

Prior to the flooding of the support, a slider which is provided in the area of the air bag cover is moved backwards, and the second cavity in the area of the air bag cover is expanded towards the rear side of the support, so that upon flooding the support with elastomeric material by means of the passages that are provided in the support or in the air bag cover, the decorating layer is expanded up to the rear side of the air bag cover. In this manner, a multifunctional layer is formed with the thermoplastic elastomeric material enclosing the air bag cover on both sides and which exhibits at the viewing side optical and haptic functions and which in the area of the air bag cover functions additionally as a hinge, splinter protection and energy absorber. The functional scope of the multifunctional layer is configured as a material unit into which the air bag cover is embedded in sandwich-like manner.

The support material can be reinforced additionally by means of glass fibers or textile natural fibers. The decorating layer itself, depending on demand, can be configured as a compact layer or a foamed layer, whereby however, the layer at the rear side of the support, in the area of the air bag as well as in the area of the hinge, functions as a splinter protection and a energy absorber, is always constructed as a compact layer.

Since the multifunctional layer exhibits a relatively high stability, the rupture line required for the opening of the air bag has to be arranged such that the line is essentially free of the multifunctional layer and thus extends advantageously through the support up to the decorating layer.

The rupture line in the component can be made in a separate work step after opening of the mold tool, and the component has freed from the core but still adjoins the mold counter part.

An especially advantageous embodiment of the method according to the present invention provides that a rupture line is made in the component during the injection molding cycle by means of a perforation tool integrated in the mold tool. For this purpose, a movable perforation tool can be integrated into the mold tool core that includes a perforation blade or perforation needles, wherein the perforation tool is arranged so that it projects into the support layer during the first injection molding cycle and thus generates passages in the support, while in the second injection molding cycle, the movable perforation tool, in the form of a blade or in the shape of needles, is moved forward into the decorating layer.

This variant of the method according to the present invention is especially advantageous when combined with a foamed layer in the second injection molding cycle, where the second mold counter part runs through an expansion lift, while the thermoplastic material that is charged with a physical or chemical blowing agent foams, and thus forming a foaming layer which has a compact skin towards the viewing side of the interior paneling component.

In a preferred variant of this embodiment, the rupture line is formed by the foamed layer up to the compact outer skin.

The present invention also refers to a device for the production of an interior paneling component for a motor vehicle with integrated air bag cover, wherein the device includes at least a two step mold tool with a mold tool core and a first mold tool counter part with a first cavity for molding the support with an integrated air bag cover in a first method step, as well as a second counter part with a second cavity for molding a decorating layer in a second method step. At the same time, the part of the mold tool forming the rear side of the air bag cover is configured as a slider for molding the additional cavity at the rear side of the support, or the air bag cover. This additional cavity is used in the second injection molding cycle and serves to provide an elastomeric layer for the rear side of the support or the air bag cover which functions as a splinter protection. At the same time, the layer, in the area of the corresponding passages takes on the function of a hinge and an energy absorber.

An especially advantageous embodiment of the device according to the present invention includes additionally perforation tools that are arranged in a movable manner by means of which rupture lines are introduced into the interior paneling component during the production process. Suitable perforation tools are slidably arranged cutting blades or needles. In another preferred embodiment of the device according to the present invention, it is contemplated that the cavity of the second mold counter part is configured for expansion for the formation of a foamed layer.

BRIEF DESCRIPTION OF THE DRAWING

The invention will be illustrated in detail through the following drawings.

There it is shown in.

DETAILED DESCRIPTION OF PREFERRED EMBODIMENTS

Figure 1:
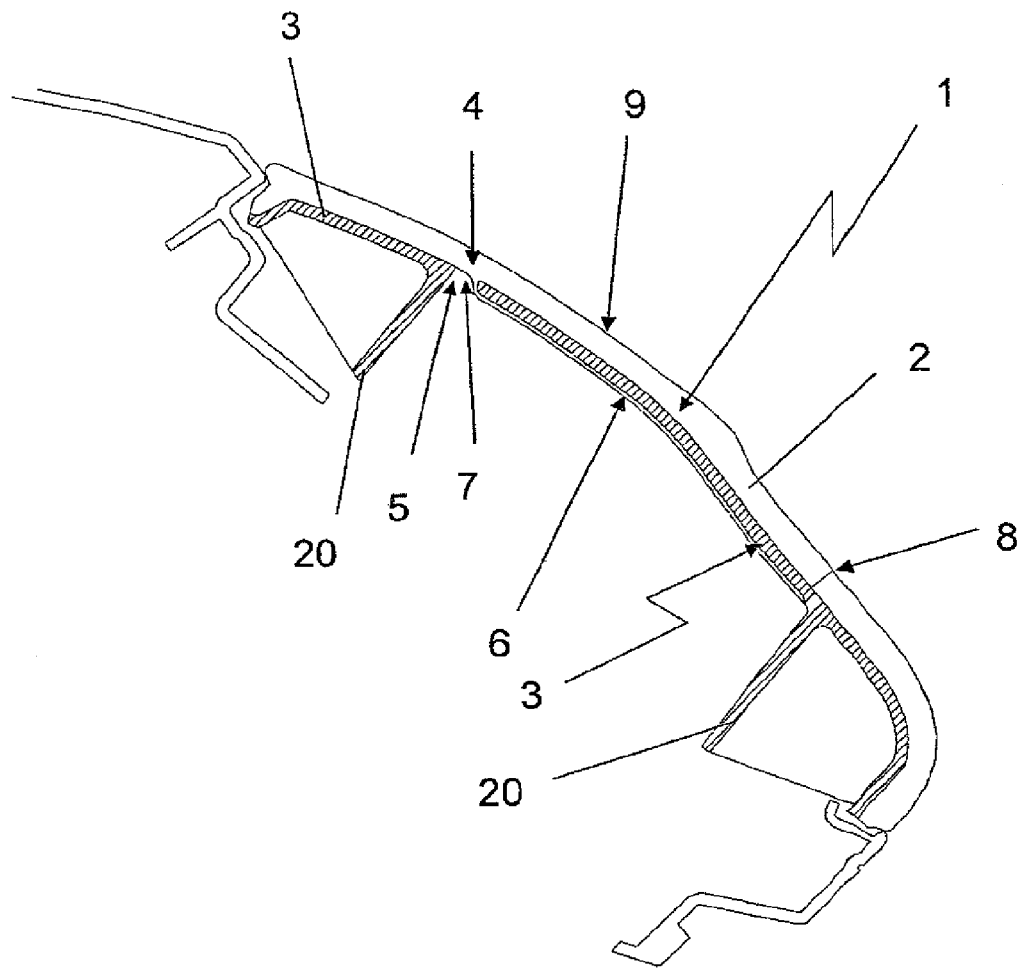
FIG. 1 a cross section of an interior paneling component.

FIG. 1 shows the cross section of an interior paneling component with an integrated air bag cover 1. In this case, it is a dashboard, which is constructed essentially of a support 3 with an integrated air bag cover 1 and a decorating layer 2. The support 3 exhibits different areas, for example, directly next to the area of the air bag cover, a deployment channel is formed onto support 3. In the area of the air bag cover 1, the support 3 shows an opening 5, which in the present illustration is filled with an elastomeric material of the decorating layer 2, such that a hinge 4 is formed there, which causes the air bag cover 1 to swing open, in the case when the air bag deploys and at the same time acts as an energy absorber. In order to control the swinging open in case of a crash, a rupture line 8 is arranged at the side opposite the hinge 4 of the air bag cover 1 extending through the support 3 up into the decorating layer 2, in order to realize a sufficient weakening of the component in the area of the air bag cover 1 for a targeted and easy opening of the air bag cover 1. This weakening area 8 borders the air bag cover 1 in correspondence to the area of the hinge 4, so that the air bag cover 1 can swing open at the hinge 4.

The air bag cover 1 is embedded into the decorating layer 2 in a sandwich-like manner, whereby the decorating layer 2 is constructed as a layer that encloses the air bag cover 1 on both sides. At the viewing side of the interior paneling component, this layer has optic and haptic functions; at the rear side of the air bag cover 1, this layer functions as a splinter protection 6. In the area of passage 5, the decorating layer 2 additionally acts as a hinge as well as an energy absorber.

In order to fulfill these function, the decorating layer is preferably constructed from an elastomeric plastic from the group of thermoplastic polyetherester (TPEE), thermoplastic polystyrene (TPS), thermoplastic vulcanizing material (TPEV), polyvinylchloride (PVC) or thermoplastic polyurethane (TPU). The decorating layer can be constructed as a compact layer or a foamed layer. In any event however, the area of the splinter protection 6 at the rear side of the air bag cover 1 is formed as a compact layer. In the area of the hinge 4 also, portions of the decorating layer 2 are constructed as a compact layer in order to realize a sufficient stability of the hinge 4, as well as energy absorption. The same holds true for the area of the splinter protection 6 where the decorating layer 2 has to exhibit a sufficient firmness in order to realize the desired security for the passengers and to prevent splintering of the air bag cover.

Figure 2:
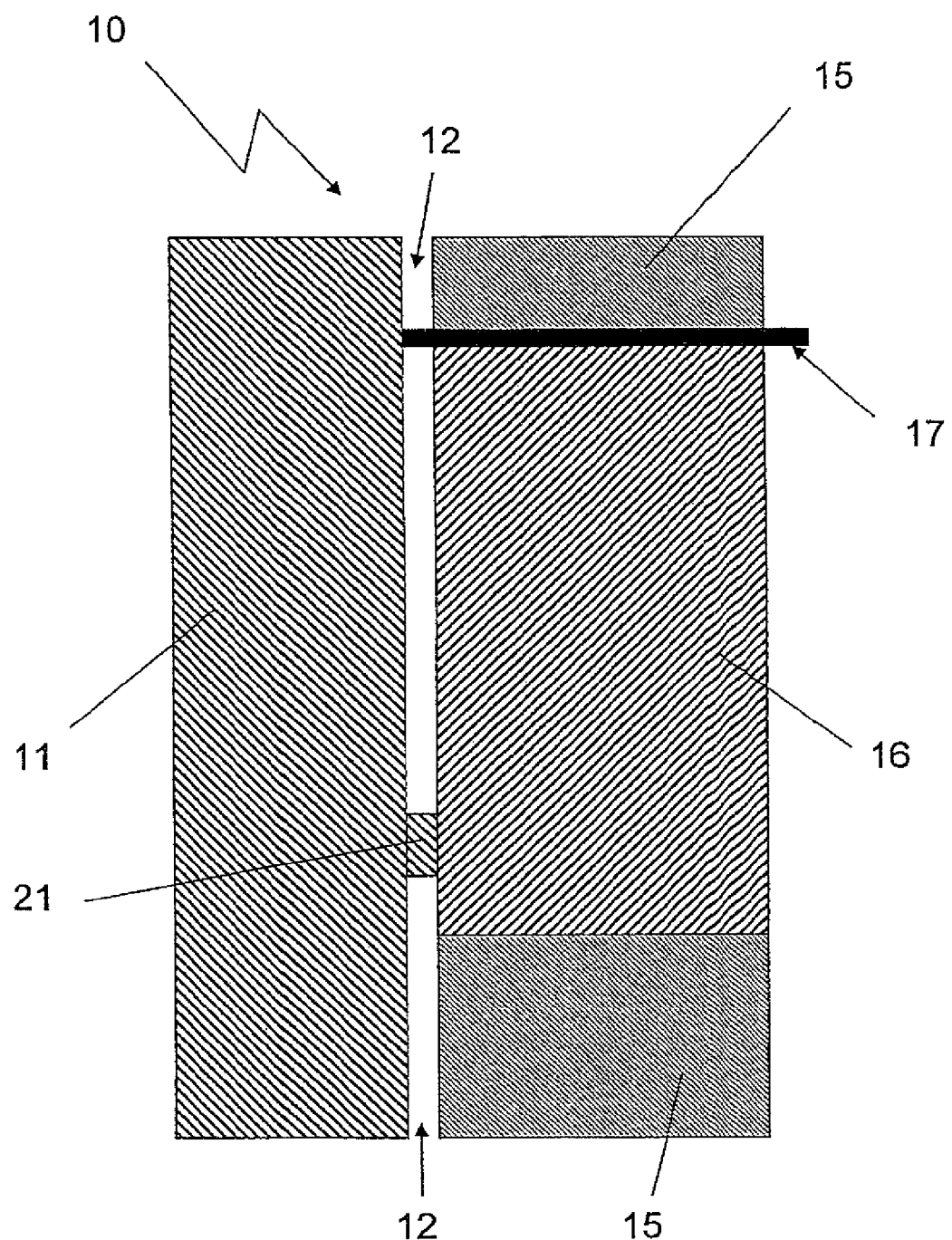
FIG. 2 the cross section of a schematic illustration of a two step mold tool before the first molding cycle.

FIG. 2 shows in a schematic illustration the cross section of a detail of a two step mold tool 10. The mold tool 10 consists essentially of a mold tool core 15 and a first mold counterpart 11 and between them a first cavity 12 is formed, which is provided for the production of the support. In the area of the air bag cover 1, the mold tool core 15 is provided with a slider 16, which is slidably integrated in the mold tool core 15. At the edge of the air bag cover 1, the embodiment of the device according to the present invention in FIG. 2 shows a perforation tool 17, which, in the present illustration projects into the cavity 12. In addition, the cavity also shows additionally in the area of the future passage for the hinge, a corresponding form 21 at the first mold tool counter part 11.

Figure 3:
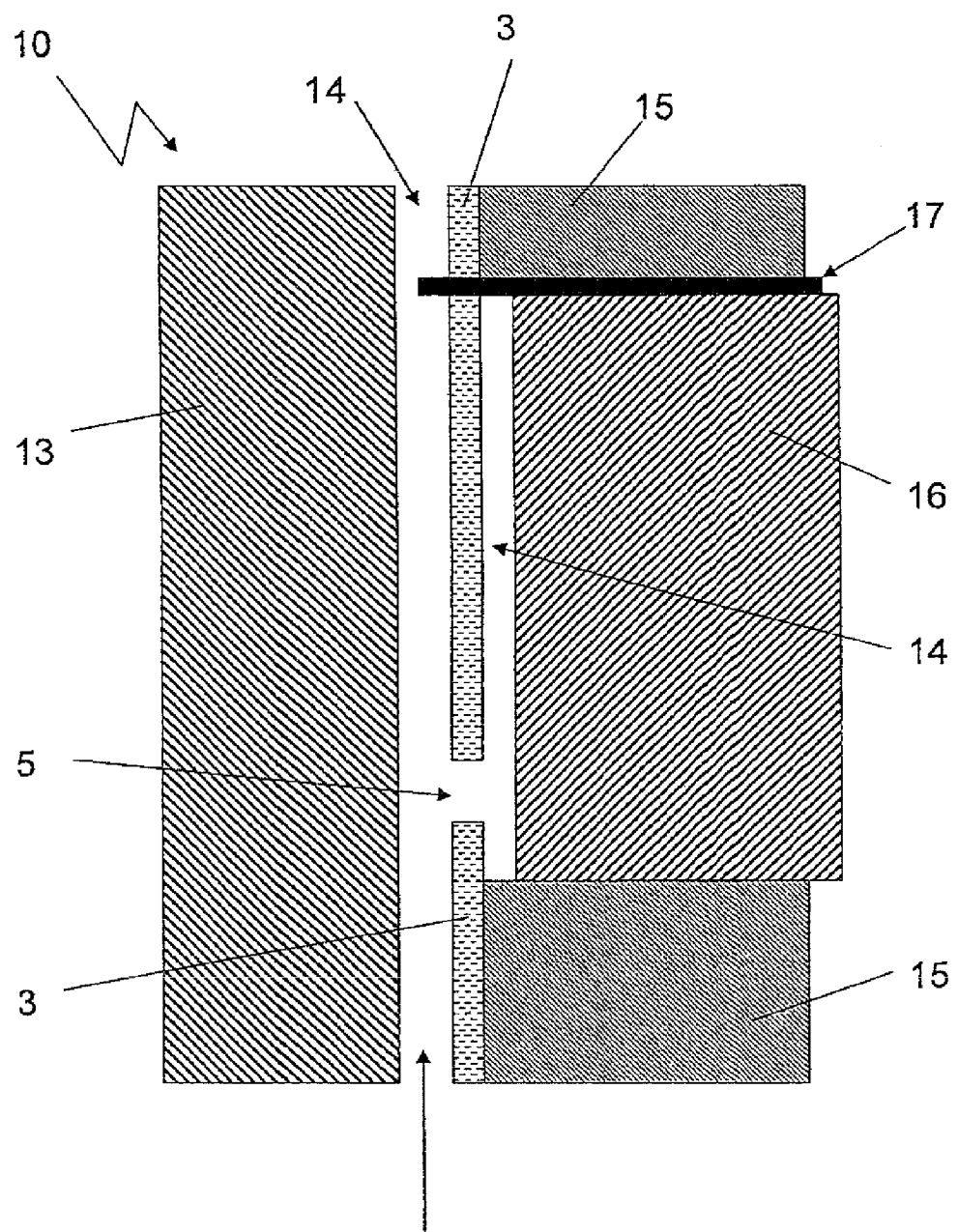
FIG. 3 the cross section of a schematic illustration of a two step mold tool before the second molding cycle.

FIG. 3 shows the two step mold tool 10 of FIG. 2 also as a schematic section of a detail of the mold tool 10 after the first forming cycle. The mold tool core 15 is unchanged, while the first mold tool counter part, utilized for the formation of the support 3, is already replaced by the second mold tool counter part 13. Between the support 3 that remained at the mold tool core 15 and the mold counter part 13, a second cavity 14 is formed which is expanded up to the rear side of the support 3 via the passage 5, since the slider 16, integrated into mold tool 15, is also already moved rearward, thus causing the expansion of the cavity. In the illustration shown in FIG. 3, the movable perforation tool 17 which is also integrated into the mold tool core 15 is extended up to the second cavity 14.

The illustration in FIG. 3 shows the mold tool 10 before the second forming cycle, where the cavity 14 is filled with the thermoplastic elastomeric material for the decorating layer, the formation of which can be carried out in two different ways.

On the one hand, a compact layer can be formed, by injecting a thermoplastic elastomeric material into the second cavity 14 shown in FIG. 3, from where it connects to the support and after cooling embeds the support in the area of the air bag cover 1 in a sandwich-like manner. Thereby, an energy-absorbing hinge is formed in the area of the passage 5, while the decorating layer at the rear side of the air bag cover takes over the function of a splinter protection.

Figure 4:
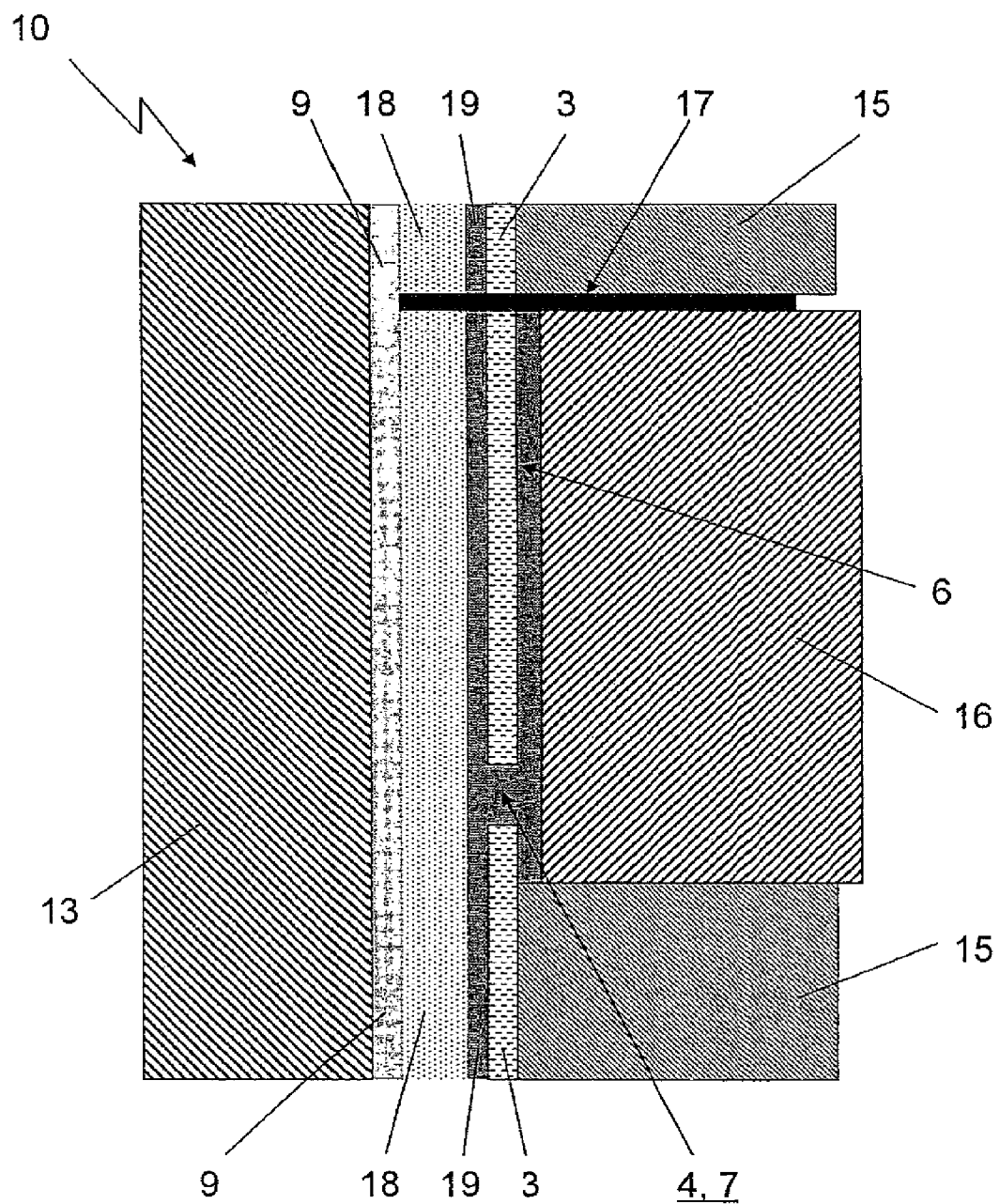
FIG. 4 the cross section of a two step mold tool after the second molding cycle.

FIG. 4 shows a further advantageous possibility how to construct the decorating layer 2. FIG. 4 shows the mold tool 10 of FIG. 3 after a second molding cycle, where in addition, an expansion lift is carried out with the mold counter part 13. For the formation of the decorating layer 2, a thermoplastic elastomeric material that was charged with chemical or physical blowing agents, such that after the expansion lift a foamed decorating layer is formed that is composed of a decorating skin 9, a foam layer 18 and a compact layer 19. The decorating skin 9 thus forms the viewing side of the later formed interior paneling component. The decorating skin 9 is followed by a foamed layer 18, which determines especially the haptic properties of the decorating layer. Towards the support 3 and at the rear side of the support 3, as well as in the area of the hinge 4, a compact layer 19 is formed, which, at the rear side of the support 3, takes on the function of the splinter protection 6 and (in the area of the passage 5 of FIG. 3) from the hinge 4. The perforation tool 17 integrated into mold tool core 15 was introduced during the second molding cycle up to the form skin 9 in the decorating layer 2 it can later fashion the rupture line.

Figure 5:
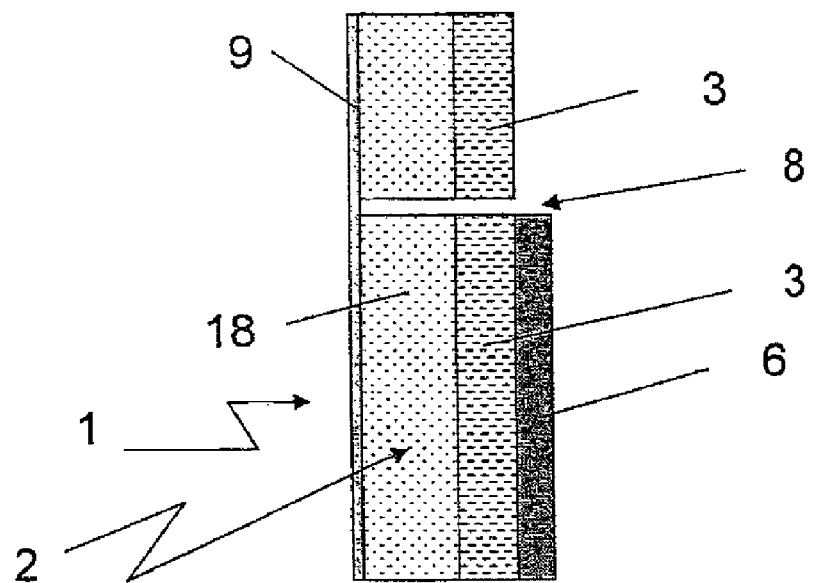
FIG. 5 the cross section of a detail of an interior paneling component.

FIG. 5 shows the cross section of a detail of an interior paneling component with an integrated air bag cover 1, with a decorating layer 2, which is constructed of a from skin 9 and a foamed layer 18. At the rear side of the support 3, a splinter protection 6 is formed. In addition in FIG. 5, the rupture line 8 is shown, which after removal of the movably arranged perforation tool is formed in the interior paneling component and thereby advances up to the form skin 9.

Figure 6:
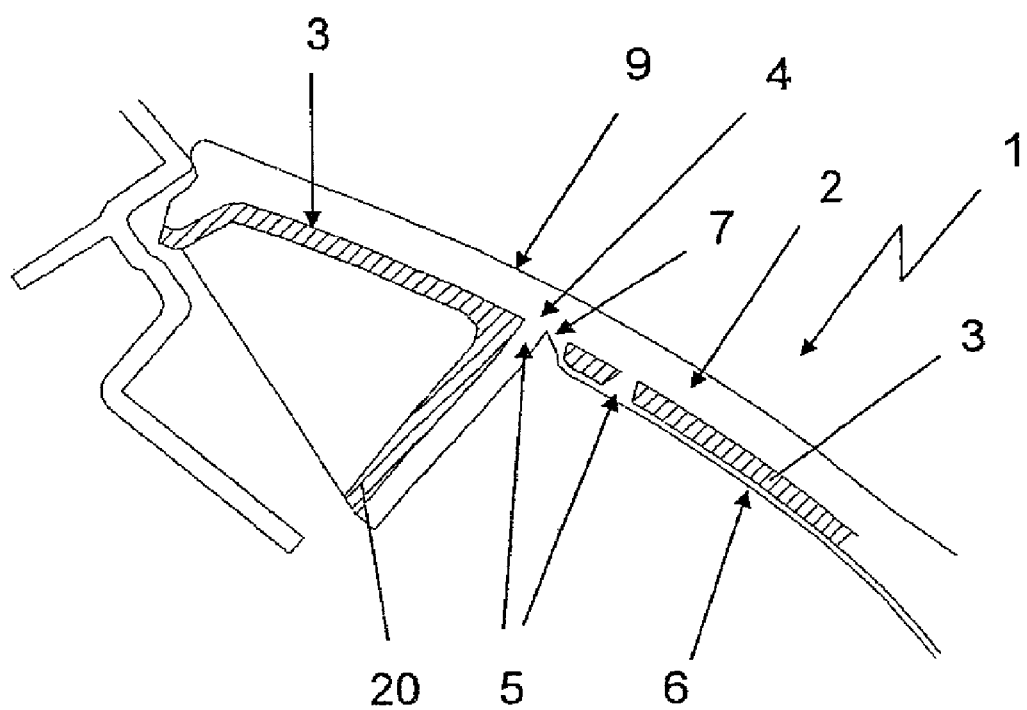
FIG. 6 the cross section of a partial area of an interior paneling component.

FIG. 6 shows, in lieu of many other possible variants of the method according to the invention or the corresponding components, a section of an interior paneling component, where several passages 5 are provided in support 3 for flooding the rear side of the support 3 or the air bag cover 1 with the decorating layer 2. In this manner, the formation of the splinter protection 6 at the rear side of the support 3 or the air bag cover 1 is made easier. Furthermore, the illustration of the present invention in FIG. 6 shows additionally, in the area of the hinge 4, flooding of the deployment channel 20 with decorating material which is accomplished by means of a corresponding configuration of the slider 16 which is provided in the mold tool. The flooding of the support 20 with decorating material also results in a reinforcement of the hinge 4, thereby increasing the safety of the passengers upon deployment of the air bag, as in this manner, an additional hold of the air bag cover at support 3 is effected.

What is claimed is:

1. An interior paneling component for motor vehicles, comprising:
    a support comprising a decorating layer and an air bag cover integrated into the support,
    said decorating layer in the area of the air bag cover is configured as a multifunctional layer which encloses the air bag cover on both sides, wherein the multifunctional layer forms a material unit with the air bag cover embedded in sandwich-like manner into the multifunctional layer,
    said support provided with at least one opening in the area of the air bag cover to provide the multifunctional layer with a hinge function, wherein the multifunctional layer at a viewing side of the interior panel component has optical and haptic functions; and in the area of the air bag cover the multifunctional layer has the function of splinter protection and as an energy absorber.

2. The component according to claim 1, wherein the support is made of a thermoplastic material from the group of polypropylene (PP), polybutyleneterephthalate (PBT), polyamide (PA), acrylonitrile-butadiene-styrene (ABS), acrylonitrile-butadiene-stryrene/polycarbonate-copolymerisate (ABS/PC) or polyoxymethylene (POM.

3. The component according to claim 1, wherein the support is reinforced with fibers selected from the group of glass fibers or textile natural fibers.

4. The component according to claim 1, further comprising a decorating layer made from thermoplastic elastomeric material from the group of thermoplastic polyetherester (TPEE), thermoplastic polystyrene (TPS), thermoplastic vulcanized material (TPEV), polyvinylchloride (PVC) or thermoplastic polyurethane (TPU).

5. The component according to claim 4, wherein the decorating layer is constructed as a compact layer.

6. The component according to claim 5 wherein the decorating layer is chemically or physically foamed.

7. The component according to claim 1, wherein additional passages are disposed in the area of the air bag cover.

8. The component according to claim 1, wherein the air bag cover is bordered outside of the hinge area by a rupture line configured as a perforation or groove extending through the support into the decorating layer.

9. The component according to claim 1, wherein the interior panel component in the decorating layer is weakened by the formation of a rupture line except for a residual wall portion which is configured as a decorating skin.

10. A method for the production of an interior paneling component for a motor vehicle, said interior paneling component being essentially constructed of a decorating layer and a support with an integrated air bag cover comprising the steps of:
    providing at least a two step mold tool comprising a mold tool core,
    in a first step, molding the support with the integrated air bag cover with a thermoplastic material with a first mold counter part and a first cavity via a first injection molding cycle, and
    in a second step, molding the decorating layer with a second mold counterpart and a second cavity in a second injection molding cycle by flooding the support with the thermoplastic elastomeric material, wherein prior to so flooding the support, moving a slider provided in the mold tool core in the area of the air bag cover and thereby increasing the volume of the second cavity via a passage towards the rear side of the support, such that upon flooding the support with the thermoplastic elastomeric material, a multifunctional layer is formed enclosing the air bag cover on both sides, wherein the multifunctional layer has a viewing side at the interior paneling component including optical and haptic functions and at a side away from the viewing side, in the area of the air bag cover, the multifunctional layer has additional functions as a hinge, a splinter protection device and an energy absorber, wherein the functional area of the multifunctional layer forms a material unit embedded into the air bag cover in a sandwich-like manner.

11. The method according to claim 10, wherein the component after completion is provided with a rupture line.

12. The method according to claim 10, wherein the component is provided with a rupture line during the injection molding cycle by means of perforation tool integrated in the mold tool core.

13. The method according to claim 12, wherein the perforation tool includes cutting blades and perforation needles.

14. The method according to claim 10, wherein during the second injection molding cycle, an expansion stroke is run for the formation of a foamed layer.

15. A device for the production of an interior paneling component for motor vehicles with integrated air bag cover, the device comprising:
    at least a two step mold tool with a mold tool core and a first mold counterpart with a first cavity between mold tool core and the first mold counterpart for forming a support for the interior paneling component
    a second mold counter part adjacent a second cavity for the formation of a decorating layer onto the formed support in a second method step,
    a movable slider provided as a portion of the mold tool core, said slider movable up to a back side of the formed support, wherein the volume of the second cavity is expanded when the slider is moved prior or during a second injection molding cycle.

16. The device according to claim 15, wherein a movable perforation tool is integrated into the mold core.

17. The device according to claim 16, wherein the perforation tool comprises a cutting blade and/or perforation needles.

18. The device according to claim 15, wherein the second cavity of the second mold counter part is expandable for the formation of a foamed layer.

* * * * *